United States Patent
Sahi et al.

(10) Patent No.: US 9,302,716 B2
(45) Date of Patent: Apr. 5, 2016

(54) COMPENSATOR ASSEMBLY FOR A VEHICLE FRAME

(71) Applicant: Ford Global Technologies, LLC, Dearborn, MI (US)

(72) Inventors: Jaspinder S. Sahi, Novi, MI (US); John T. Reed, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 14/252,205

(22) Filed: Apr. 14, 2014

(65) Prior Publication Data

US 2015/0291224 A1  Oct. 15, 2015

(51) Int. Cl.
| | |
|---|---|
| *B62D 27/06* | (2006.01) |
| *B62D 25/06* | (2006.01) |
| *F16B 5/02* | (2006.01) |
| *F16B 5/06* | (2006.01) |
| *F16B 37/00* | (2006.01) |
| *F16B 37/02* | (2006.01) |
| *F16B 37/04* | (2006.01) |

(52) U.S. Cl.
CPC .............. *B62D 27/065* (2013.01); *B62D 25/06* (2013.01); *F16B 5/025* (2013.01); *F16B 5/0233* (2013.01); *F16B 5/0635* (2013.01); *F16B 37/005* (2013.01); *F16B 37/02* (2013.01); *F16B 37/041* (2013.01); *F16B 37/044* (2013.01)

(58) Field of Classification Search
CPC .................................. F16B 37/00; F16B 5/033
USPC .......................... 411/432, 546, 182, 184, 302; 296/216.01–224
See application file for complete search history.

(56) References Cited

U.S. PATENT DOCUMENTS

| | | | |
|---|---|---|---|
| 5,288,191 A | 2/1994 | Ruckert et al. | |
| 6,776,566 B2 | 8/2004 | Kobusch et al. | |
| 7,591,403 B2 | 9/2009 | Binder et al. | |
| 8,202,033 B2 * | 6/2012 | Choi | B62D 25/147 411/535 |
| 2014/0097218 A1 | 4/2014 | Bittner | |

FOREIGN PATENT DOCUMENTS

| | | | |
|---|---|---|---|
| CN | 102825997 | | 12/2012 |
| DE | 3644492 | * | 7/1987 |
| DE | 19753646 A1 | | 6/1998 |
| DE | 10063649 | * | 7/2002 |
| EP | 2174836 B1 | | 1/2012 |
| KR | 20050014154 | | 2/2005 |
| KR | 100828616 | | 5/2008 |
| KR | 20080109184 | | 12/2008 |
| WO | 2013060572 A1 | | 5/2013 |

OTHER PUBLICATIONS

Britcar (UK) Ltd., "BYH000010—Clip—Retaining Sunroof Motor G-CAT." http://www.brit-car.co.uk/product.php/110707/5497/clip_retaining_sunroof_motor_g_cat. Oct. 25, 2013. 2 pages printed.

* cited by examiner

*Primary Examiner* — Dennis H Pedder
(74) *Attorney, Agent, or Firm* — Jason Rogers; Price Heneveld LLP (57) ABSTRACT

A compensator assembly for a vehicle frame includes a base member having a clip engaging a first frame component spaced from a second frame component. An extension member is threadably coupled with the base member. A fastener extends coaxially through the base and the extension members to engage the first and second frame components. Rotation of the fastener unthreads the extension member until it contacts the second frame component.

7 Claims, 9 Drawing Sheets

COMPENSATOR ASSEMBLY FOR A VEHICLE FRAME

FIELD OF THE INVENTION

The present invention generally relates to a compensator assembly for a vehicle frame, and particularly relates to a compensator assembly that is capable of extending and securing between spaced apart frame components.

BACKGROUND OF THE INVENTION

It is generally understood that the manufacture and assembly of vehicle frames may result in production variance, such that frame components may have various spacings and specific dimensions that are inconsistent. To accommodate such variances, it is common to weld spacers or bend connection brackets between frame components. It is desired for vehicle frames to be assembled with fewer inconsistencies and to utilize lighter weight materials that maintain the structural integrity of the vehicle.

SUMMARY OF THE INVENTION

According to one aspect of the present invention, a compensator assembly for a vehicle frame includes a base member having a clip engaging a first frame component spaced from a second frame component. An extension member is threadably coupled with the base member. A fastener extends coaxially through the base and the extension members to engage the first and second frame components. Rotation of the fastener unthreads the extension member until it contacts the second frame component.

According to another aspect of the present invention, a compensator assembly for spanning between first and second frame components includes a base member having a clip for engaging the first frame component. An extension member is threadably coupled with the base member. A sleeve is retained in the extension member and has an aperture extending through the base and the extension members for receiving a fastener. Rotation of the fastener unthreads the extension member away from the clip into contact with the second frame component.

According to yet another aspect of the present invention, a compensator assembly for supporting a gap between a frame component and a moon roof structure includes a base member having a threaded portion and a clip for engaging the frame component. An extension member is rotatably coupled with threaded portion and is configured to retain a fastener within an aperture coaxial with the threaded portion. Rotation of the fastener unthreads the extension member into abutment with the moon roof structure.

According to another aspect of the present invention, a method for supporting a gap between first and second frame components includes engaging a base member of a compensator assembly to the first frame component proximate an attachment aperture. The method also provides inserting a fastener through the attachment aperture and into engagement with an extension member that is threadably coupled with the base member. Further, the method provides rotating the fastener, which unthreads the extension member away from the base member until it contacts the second frame component. The method then provides further rotating the fastener after the extension member is abutting the second frame component, causing the fastener to engage between the first and second frame components.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
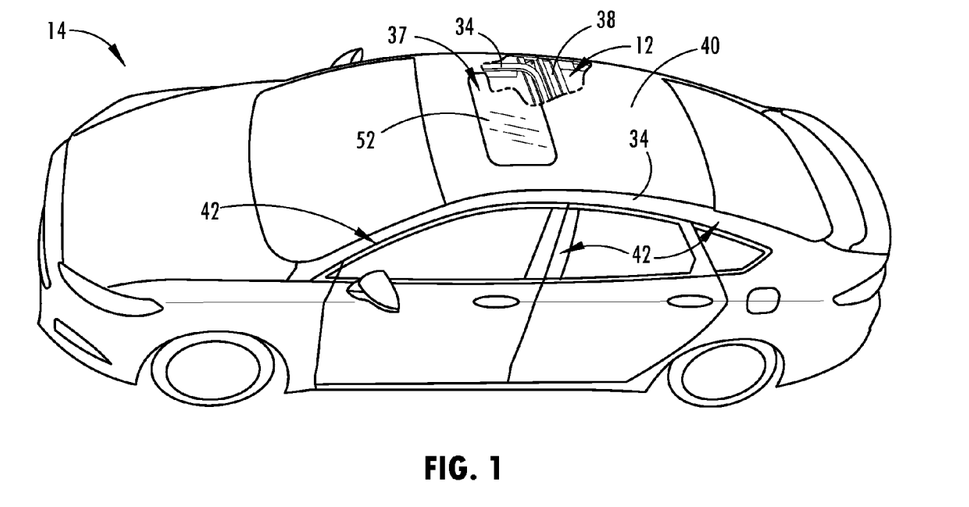
FIG. 1 is a top perspective view of a vehicle having a moon roof structure spaced from a frame component of the vehicle frame.

For purposes of description herein, the terms "upper," "lower," "right," "left," "rear," "front," "vertical," "horizontal," and derivatives thereof shall relate to the embodiment of the vehicle as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims.

Hence, specific dimensions and other physical characteristics relating to the embodiments disclosed herein are not to be considered as limiting, unless the claims expressly state otherwise.

Referring to FIGS. 1-11, reference numeral 10 generally designates a compensator assembly for a frame 12 of a vehicle 14. In the illustrated embodiment, the compensator assembly 10 is configured to couple between spaced components of the vehicle frame 12. A base member 16 of the compensator assembly 10 has a clip 18 that engages a first frame component 20 that is spaced from a second frame component 22. An extension member 24 is threadably coupled with the base member 16 or otherwise rotatably coupled with a threaded portion 26 of the base member 16. A fastener 28 may extend coaxially through the base and extension members 16, 24 to engage the first and second frame components 20, 22. The compensator assembly 10 is configured such that the initial insertion and rotation of the fastener 28 may unthread the extension member 24 until it contacts the second frame component 22, thereby supporting a gap 30 between the first and second frame components 20, 22. The first and second frame components 20, 22 may be various portions of the vehicle frame 12; however, in the illustrated embodiment the first frame component 20 comprises a bracket 32 extending from a roof rail 34 of the vehicle frame 12 and the second frame component 22 comprises a moon roof structure 36.

Referring now to FIG. 1, the illustrated embodiment of the vehicle 14 is shown with an area of the vehicle frame 12 exposed to illustrate one of the roof rails 34 extending longitudinally on opposing sides of a moon roof assembly 37. A cross member 38 is also partially illustrated, which spans laterally between the roof rails 34 to support the moon roof assembly 37 and other portions of the roof 40. In the illustrated embodiment, the roof rails 34 are supported by pillars 42 that extend upward around an interior cabin of the vehicle 14, as generally understood by one having ordinary skill in the art. The roof rails 34, cross members 38, pillars 42, moon roof assembly 37, and roof 40 are all illustrated examples of frame components of the vehicle 14, although additional frame components are also contemplated for incorporating a compensator assembly 10 as described herein. It is also conceivable that the compensator assembly 10 may be incorporated in vehicle frames of alternative types of vehicles, such as a truck, a sport utility vehicle, or a van, that may have alternative frame components or roof configurations, as generally understood by one having ordinary skill in the art.

Figure 2:
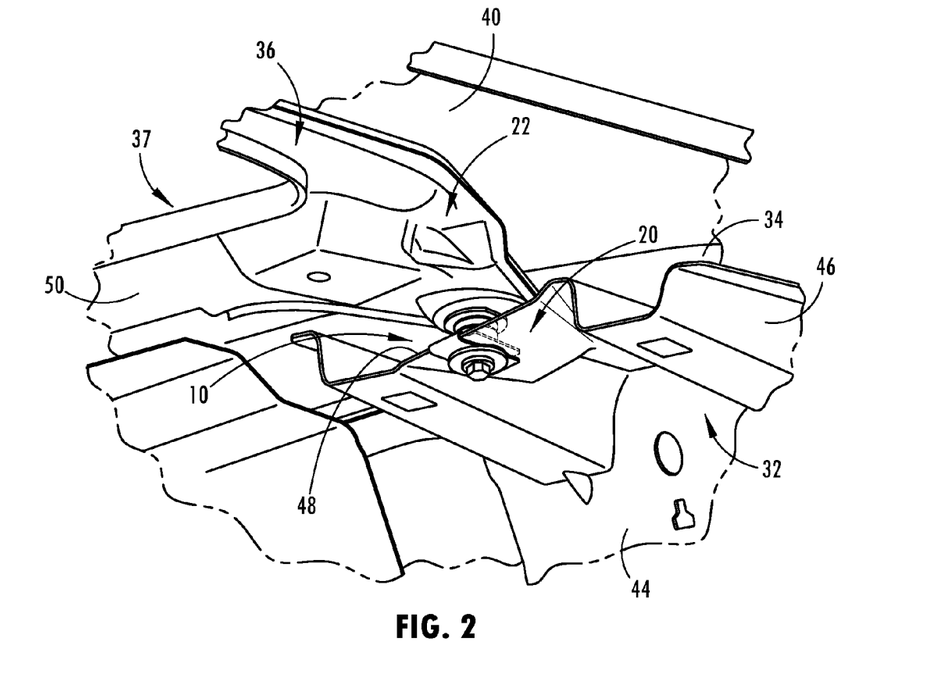
FIG. 2 is a bottom perspective view of a compensator assembly according to one embodiment of the present invention, which is illustrated supporting a gap between a frame component and the moon roof structure, as shown in FIG. 1.

As illustrated in FIG. 2, the roof rail 34 includes the bracket 32 extending laterally inward proximate a B-pillar of the vehicle frame 12. The bracket 32 in the illustrated embodiment is formed with sheet metal to have a substantially vertical portion 44 that attaches with the roof rail 34 and a substantially horizontal portion 46 that is configured with a generally planar body having a mounting surface 48 for attaching the moon roof assembly 37. The moon roof assembly 37 in the illustrated embodiment includes a structural portion 50, commonly referred to as a ring reinforcement, that surrounds a glass portion 52 (FIG. 1) of the moon roof assembly 37. The structural portion 50 in the illustrated embodiment has a support flange 54 that protrudes laterally from the glass portion 52 and downward for engaging the bracket 32. The support flange 54 has an attachment location that generally aligns in vertical orientation with the mounting surface 48 of the bracket 32, defining a gap 30 between the bracket 32 and the structural portion 50 of the moon roof assembly 37. It is appreciated that the gap 30 may vary in size across a plurality of vehicle frames that are manufactured for the same type of vehicle. It is also contemplated that the gap 30 may vary at different locations between the moon roof assembly 37 and the bracket 32 or between other vehicle frame components that are fastened to one another, which may be accommodated with a compensator assembly 10 according to additional embodiments of the present invention.

Figure 2A:
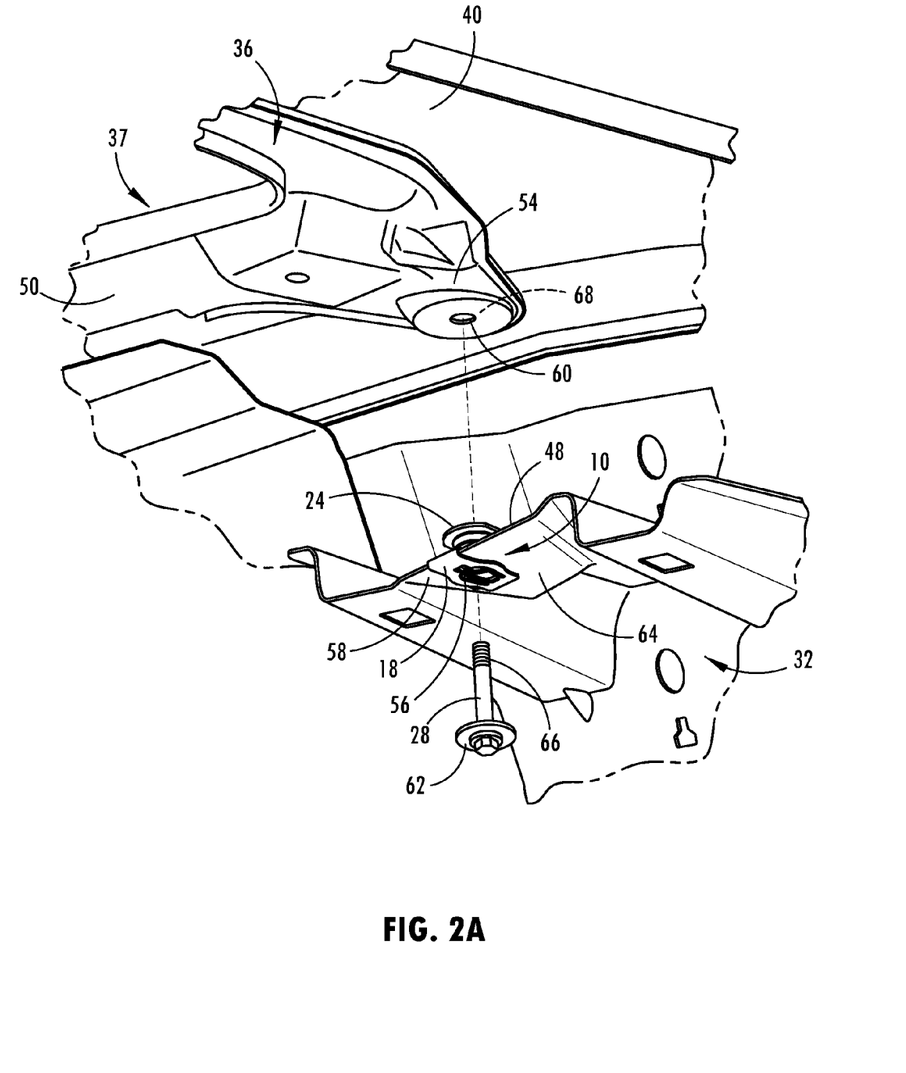
FIG. 2A is an exploded bottom perspective view of the compensator assembly shown in FIG. 2, having a fastener disengaged and the frame component exploded away from the moon roof structure.
Figure 2B:
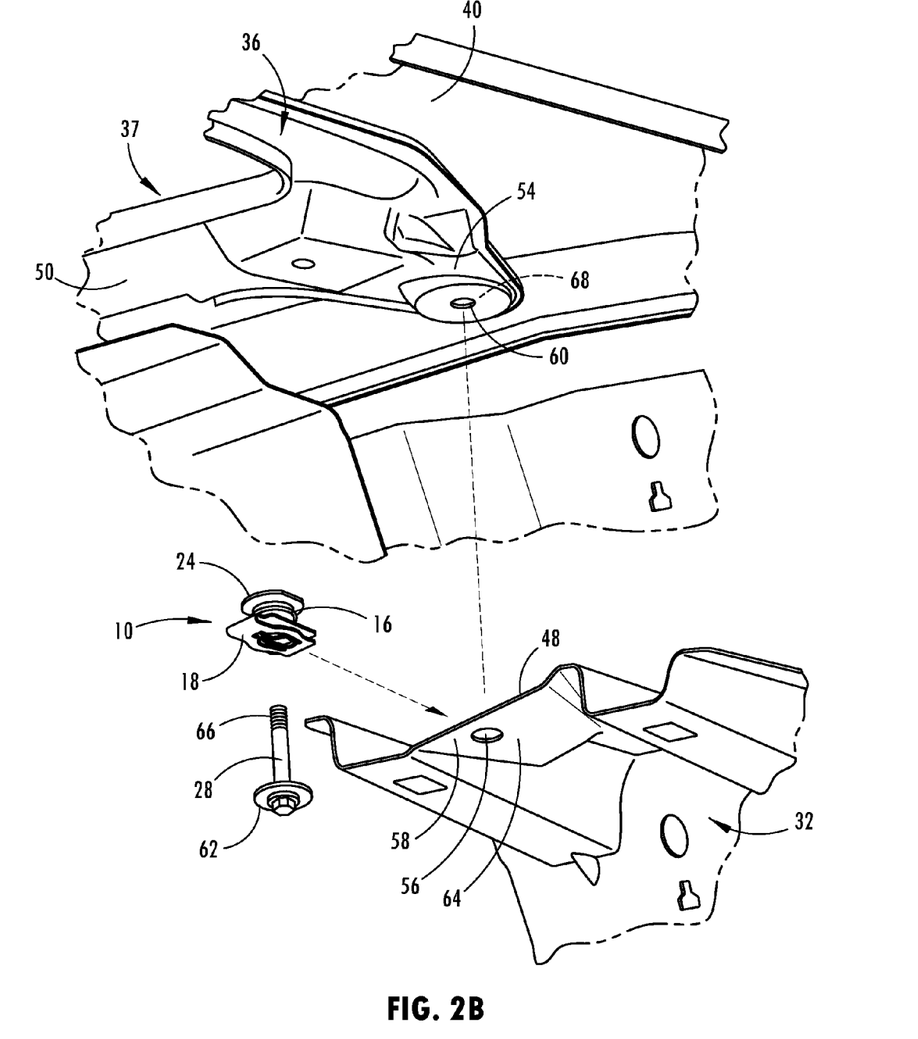
FIG. 2B is an exploded bottom perspective view of the compensator assembly shown in FIG. 2, having a base member of the compensator assembly disengaged from the frame component.
Figures 3, 4:
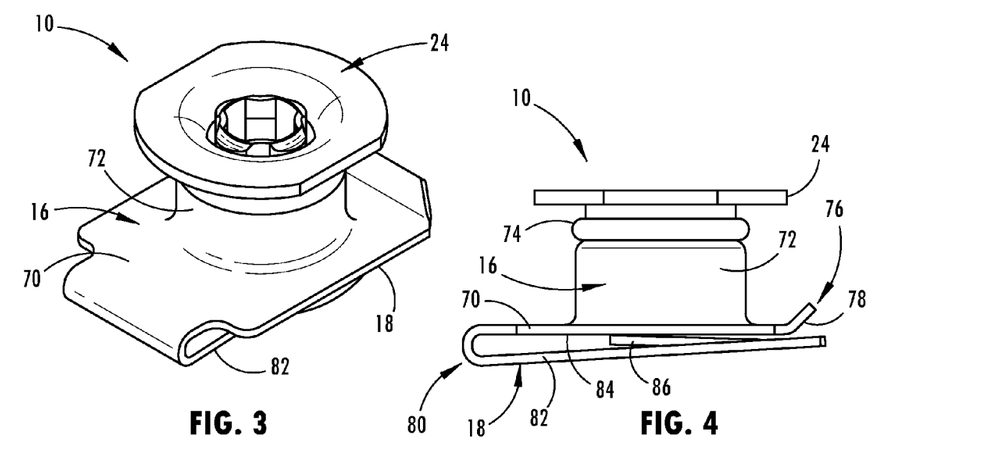
FIG. 3 is a top perspective view of a compensator assembly according to one embodiment of the present invention.
FIG. 4 is a side elevation view of the compensator assembly shown in FIG. 3.

As shown in FIGS. 2A-2B, the mounting surface 48 on the bracket 32 includes an attachment aperture 56 extending vertically through the generally planar body of the bracket 32. The attachment aperture 56 is located proximate an edge 58 of the bracket 32, such that the clip 18 on the base member 16 of the compensator assembly 10 may engage the edge 58 of the bracket 32 to align with the attachment aperture 56. The support flange 54 extending from the structural portion 50 of the moon roof assembly 37 has a corresponding connection aperture 60 in substantially vertical alignment with the attachment aperture 56 through the bracket 32. Such alignment allows the fastener 28 to extend through the base member 16 and the extension member 24 of the compensator assembly 10 and engage between the bracket 32 and the structural portion 50 of the moon roof assembly 37. In the illustrated embodiment, a head 62 of the fastener 28 has a greater diameter than the attachment aperture 56 for retaining the head 62 against a bottom surface 64 of the bracket 32 and also allowing a threaded shaft portion 66 of the fastener 28 to engage a nut 68 or other threaded member fixed to or otherwise integrally formed with the structural portion 50 of the moon roof assembly 37 in coaxial alignment with the corresponding connection aperture 60.

Referring now to FIGS. 3-6, the base member 16 of the illustrated embodiment includes a substantially planar platform section 70 with a barrel section 72 protruding upward from a central area of the platform section 70. The barrel section 72 includes a generally cylindrical shape that is bordered proximate the top end of the barrel section 72 with an inset diameter, defining a narrow portion 74. An exterior-facing end 76 of the platform section 70 is angled upward to provide a ramped surface 78 for engaging the edge 58 of the bracket 32. An opposing interior-facing end 80 of the platform section 70 includes a primary retention member 82 of the clip 18 that integrally spans beneath the platform section 70 in general alignment therewith. The primary retention member 82 is slightly angled and thereby biased toward a bottom surface 84 of the platform section 70. A secondary retention member 86 extends inward from the distal end of the primary retention member 82, proximate the exterior-facing end 76 of the platform section 70, extending toward the interior-facing end 80 and angled further toward the bottom surface 84 of the platform section 70 to provide an additional bias. The primary retention member 82 has a central opening 88 formed in alignment with the attachment aperture 56 and an opening 90 that extends coaxially through the barrel section 72 of the base member 16. Similarly, the secondary retention member 86 partially boarders the opening 90, defining a generally horseshoe shape.

Figure 5:
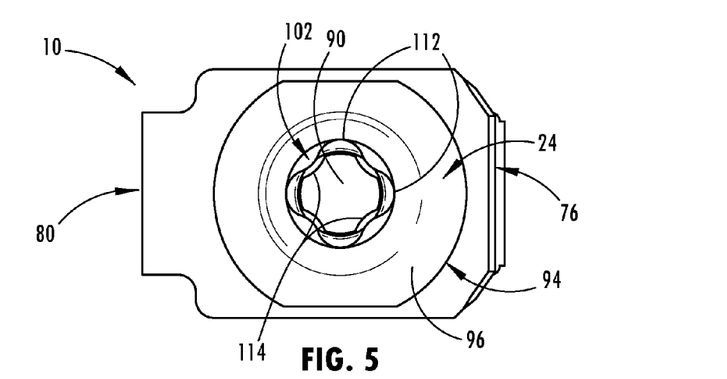
FIG. 5 is a top plan view of the compensator assembly shown in FIG. 3.
Figure 6:
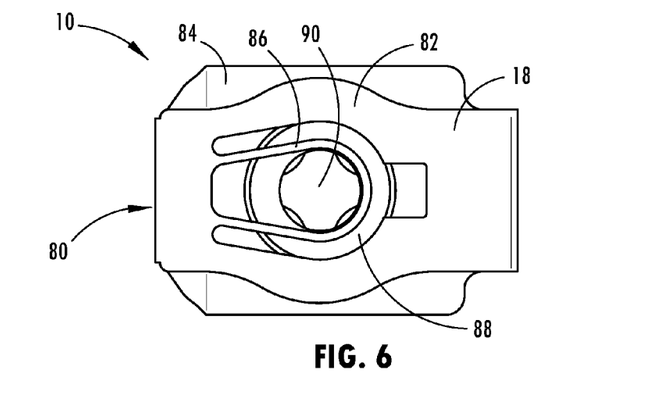
FIG. 6 is a bottom plan view of the compensator assembly shown in FIG. 3.
Figures 7, 7A:
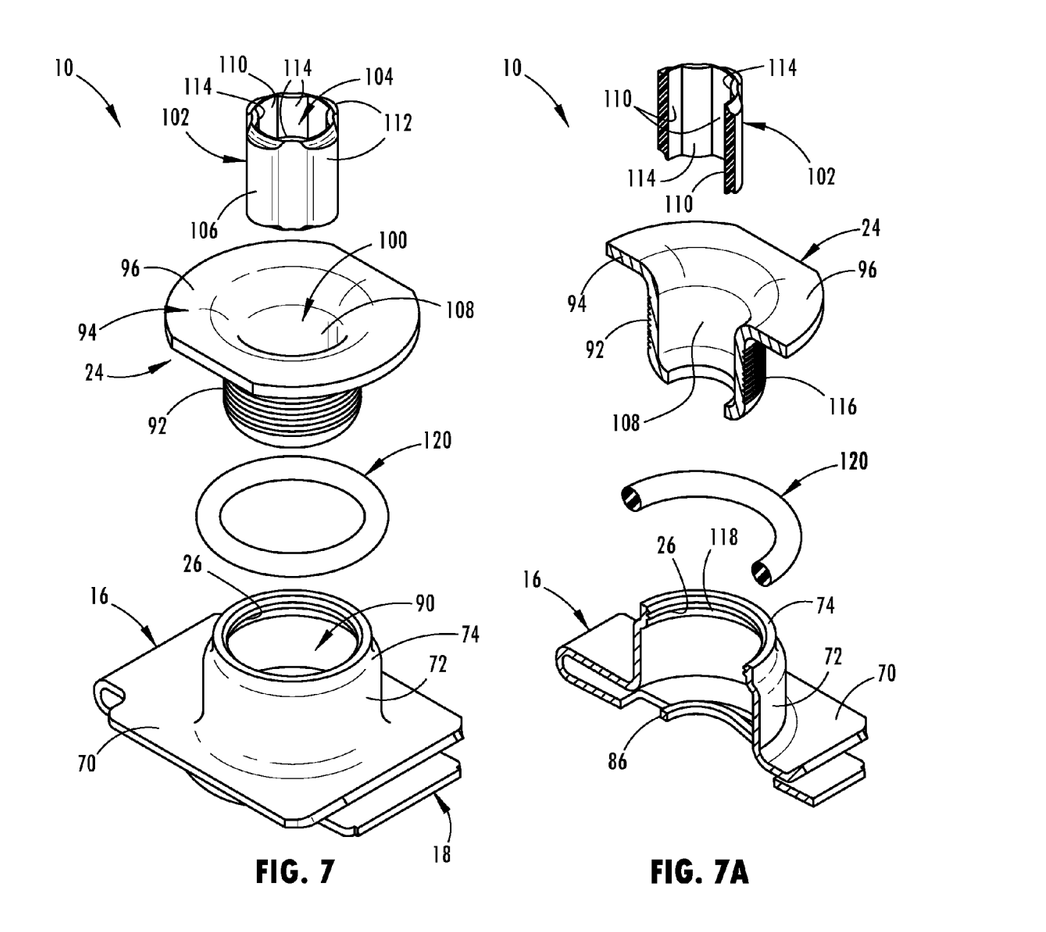
FIG. 7 is an exploded top perspective view of the compensator assembly shown in FIG. 3.
FIG. 7A is a cross-sectional view of the exploded top perspective view of the compensator assembly shown in FIG. 7.

With general reference to FIGS. 5-7, the extension member 24 of the illustrated embodiment has a lower portion 92 with a generally cylindrical shape that is sized to fit in coaxial alignment within the opening 90 through the barrel section 72 of the base member 16. An upper portion 94 of the extension member 24 includes an abutment surface 96 in substantially horizontal alignment with the bottom surface of the base member 16, whereby a length 98 (FIG. 8) of the compensator assembly 10 is defined between the abutment surface 96 of the extension member 24 and the bottom surface of the base member 16. A cavity 100 is formed downward from the abutment surface 96 into the extension member 24 and has a generally cylindrical shape in coaxial alignment with the lower portion 92 of the extension member 24. A sleeve 102 is retained in the cavity 100 of the extension member 24 that has an aperture 104 that extends through the base member 16 and the extension member 24 for receiving the fastener 28. The sleeve 102, in the illustrated embodiment, has a tubular shape with an outer surface 106 that is configured to frictionally engage an interior surface 108 of the cavity 100 and has an inner surface 110 configured to frictionally engage the threaded shaft of the fastener 28 (FIG. 2B). More specifically, the sleeve 102 has four rounded protrusions 112 that extend vertically along the outer surface 106 thereof. Between the rounded protrusions 112 on the outer surface 106 of the sleeve 102, corresponding protrusions 114 extend radially inward from the inner surface 110 of the sleeve 102, as shown in FIG. 5. It is contemplated that the sleeve 102 may be formed with various shapes and alternatively spaced protrusions, and in one embodiment may be formed from a polymer material. It is also conceivable in additional embodiments that the sleeve 102 may be formed of elastomeric materials including rubber, synthetic elastomers, composites, and other conceivable materials configured to frictionally engage both the extension member 24 and the fastener 28 with a sufficient coefficient of friction, as further defined herein. Furthermore, it is contemplated that the sleeve 102 may be retained in the cavity 100 with adhesive or may engage the fastener 28 with adhesive or other bonding material in additional embodiments.

Figure 8:
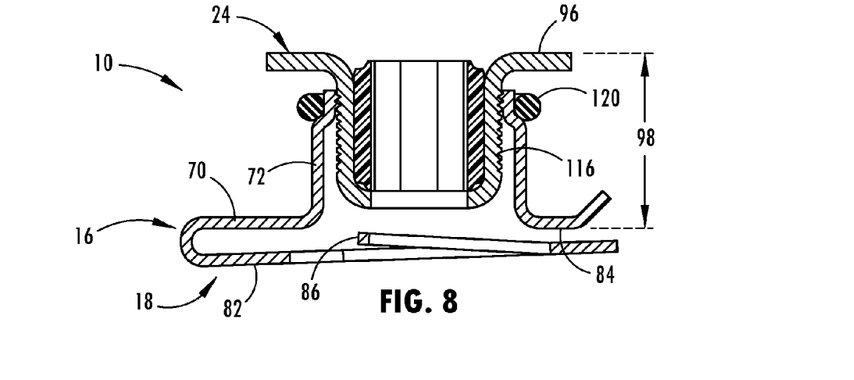
FIG. 8 is a cross-sectional view of the compensator assembly, taken at line VIII-VIII of FIG. 4.

As also illustrated in FIGS. 7A-8, an exterior surface 116 of the lower portion 92 of the extension member 24 is threaded for threadably engaging the threaded portion 26 of the base member 16. More specifically, the threaded portion 26 of the base member 16 in the illustrated embodiment is contained on an inside surface 118 of the base member 16 proximate the upper end thereof. Specifically, the threaded portion 26 in the illustrated embodiment is contained on the narrow portion 74 of the base member 16 that has an inset diameter. An O-ring 120, is also provided in the illustrated embodiment between the upper end of the base member 16 and the extension member 24 to maintain the threaded engagement between the threaded portion 26 of the base member 16 and the exterior surface 116 of the lower portion 92 of the extension member 24. It is also understood that the O-ring 120 may omitted in additional embodiments or otherwise incorporated into the base member 16 and/or the extension member 24.

Figure 9:
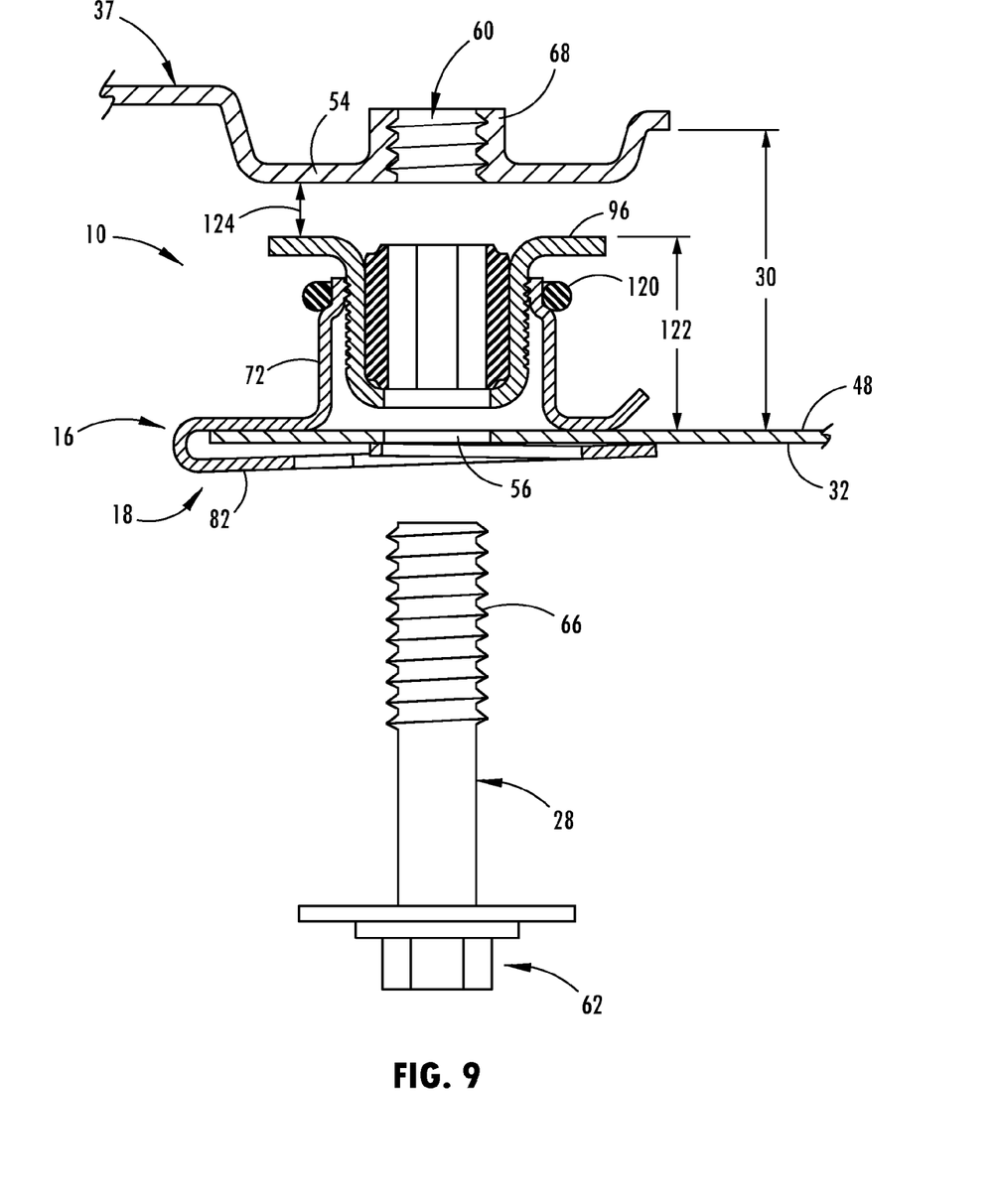
FIG. 9 is a cross-sectional view of the compensator assembly shown in FIG. 8 engaged to a first frame component that is spaced from a second frame component with the compensator assembly positioned at an installation length, according to one embodiment of the present invention.

Referring now to FIG. 9, the clip 18 on the base member 16 shown engaged with the edge 58 of the bracket 32 and aligning the attachment aperture 56 in the bracket 32 with the aperture that extends through the sleeve 102 and the base and extension members 24. The gap 30 between the bracket 32 and the structural portion 50 of the moon roof assembly 37 is further defined between the mounting surface 48 and the lower surface of the structural portion 50. It is understood that the gap 30 in the illustrated embodiment is defied after the vehicle frame 12 is assembled, or at least substantially assembled, and when the moon roof assembly 37 is subsequently installed to the vehicle frame 12. Although, it is contemplated that the gap 30 may be alternatively defined with a partially assembled vehicle frame 12 in additional embodiments. In the illustrated embodiment, the compensator assembly 10 is shown with the base member 16 and the extension member 24 at an installation length 122, which leaves a spacing 124 between the abutment surface 96 of the extension member 24 and the moon roof assembly 37. The compensator assembly 10 is configured to extend from the installation length 122 to fill the spacing 124 and thereby support the gap 30. It is appreciated that the compensator is further configured to accommodate varied spacing that assembly 10 may result from inconsistency in frame 12 manufacturing. As also shown in the embodiment illustrated in FIG. 9, the primary and secondary retention members 82, 86 of the clip 18 are biased against the bracket 32 to retain the bottom surface 84 of the base member 16 in engaged and abutting contact with the mounting surface 48 of the bracket 32.

Figure 10:
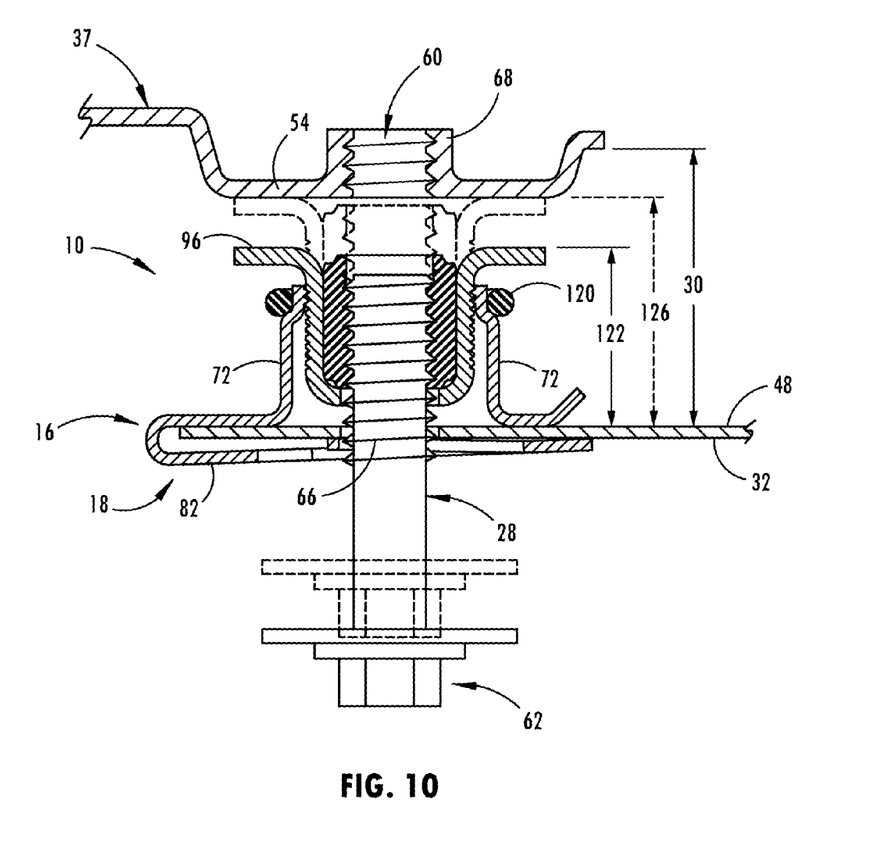
FIG. 10 is a cross-sectional view of the compensator assembly shown in FIG. 9, having a fastener engaged with an extension member that is moved into contact with the second frame component.

In operation of the illustrated embodiments of the compensator assembly 10, as shown in FIG. 10, the fastener 28 is inserted into the aperture 104 through the bracket 32 and into engagement with the sleeve 102. Thereafter, the fastener 28 is rotated, such that the extension member 24 is threaded away from the base member 16. As such, the base member 16 remains generally fixed relative to the bracket 32, allowing the rotation of the fastener 28 to rotate the extension member 24 relative to the base member 16. More specifically, the threaded shaft portion 66 of the fastener 28 frictionally engages the sleeve 102, which also is frictionally retained against the interior surface 108 of the cavity 100 within the extension member 24. A first coefficient of friction between the sleeve 102 and the fastener 28 is greater than a second coefficient of friction between the threaded portion 26 of the base member 16 and the extension member 24. As such, in the illustrated embodiment, the fastener 28 is not permitted to extend beyond the extension member 24 until the extension member 24 contacts the moon roof assembly 37. Accordingly, rotation of the fastener 28 does not overcome the first coefficient of friction until the extension member 24 abuts the moon roof assembly 37, prohibiting further extension of the extension member 24 from the base member 16 and thereby prohibiting further rotation between the extension member 24 and the base member 16.

Figure 11:
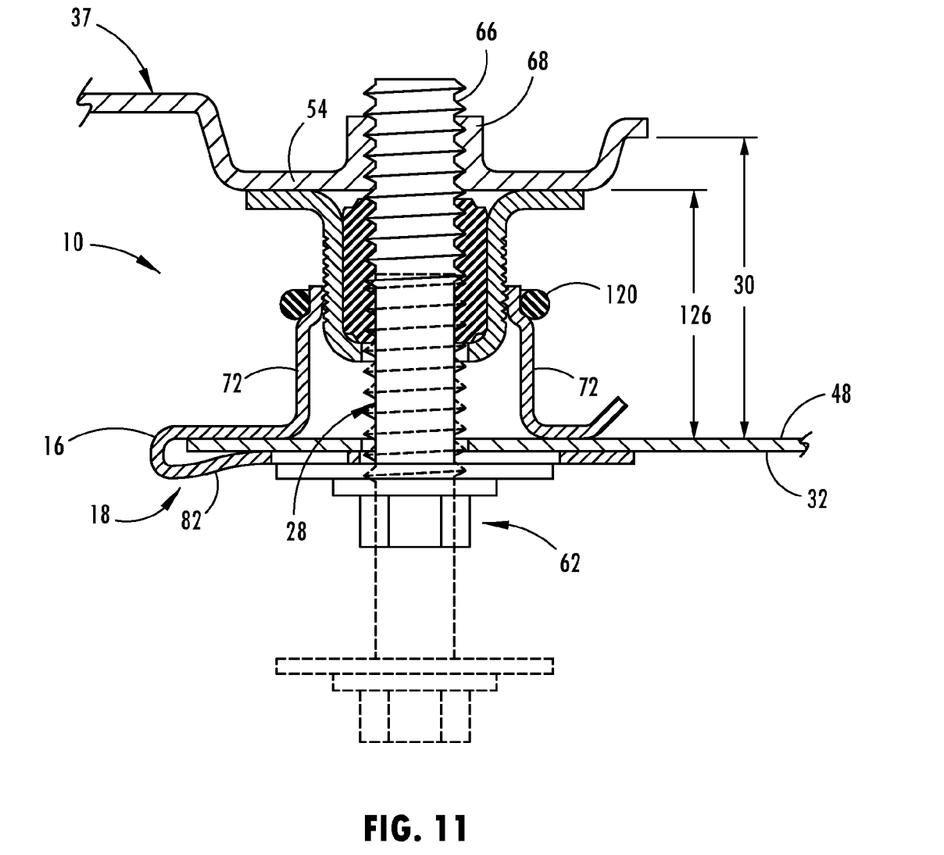
FIG. 11 is a cross-sectional view of the compensator assembly shown in FIG. 9, having the fastener engaged between the first and second frame components with the compensator assembly extended to a deployed length.

As illustrated in FIG. 11, the base member 16 and the extension member 24 are in a deployed length 126, according to one embodiment, supporting the gap 30 between the bracket 32 and the moon roof assembly 37. Once in the deployed length 126, further rotation of the fastener 28 overcomes the first coefficient of friction causing the fastener 28 to thread beyond the sleeve 102 and threadably engage the moon roof assembly 37. More specifically, the threaded portion 26 of the fastener 28 engages the nut 68 fixed with the support flange 54 of the moon roof assembly 37, according to the illustrated embodiment. Accordingly, the head 62 of the fastener 28 secures against the bracket 32, whereby the primary and secondary retention members 82, 86 of the clip 18 are secured between the head 62 of the fastener 28 and the bracket 32. Tightening of the fastener 28 generates a compression force between the moon roof assembly 37 and the bracket 32, which is opposed by the deployed length 126 of the compensator assembly 10 to provide a secure and substantially rigid connection.

Figure 12:
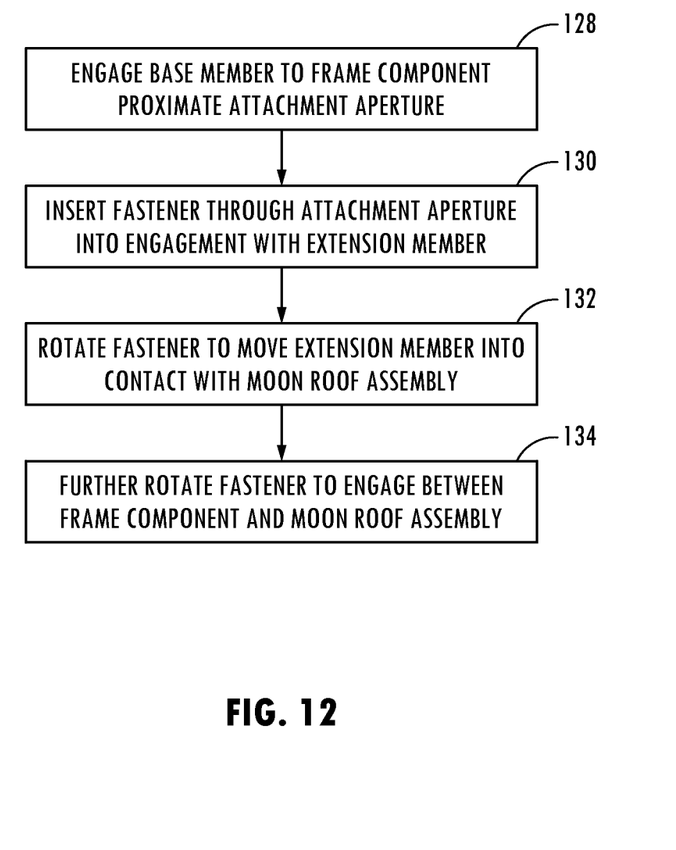
FIG. 12 is a flow chart of a method for support a gap between a frame component and a moon roof structure.

With reference to FIG. 12, a method for supporting a gap 30 between first and second frame components 20, 22 using a compensator assembly 10 of the present invention is illustrated according to one embodiment and further described as follows. Initially, at step 128, a base member 16 of the compensator assembly 10 is engaged to the first frame component 20 proximate an attachment aperture 56. More specifically, a clip 18 on the base member 16 may slidably engage an edge 58 of the first frame component 20. At step 130, the method then provides inserting a fastener 28 through the attachment aperture 56 and into engagement with an extension member 24 that is threadably coupled with the base member 16. The fastener 28 may be frictionally retained to the extension member 24 by an intermediate sleeve 102 frictionally retained therebetween. Further, at step 132, the method provides rotating the fastener 28, which unthreads the extension member 24 away from the base member 16 until it contacts the second frame component 22. At step 134, the method then provides further rotating the fastener 28 after the extension member 24 is abutting the second frame component 22, causing the fastener 28 to engage between the first and second frame components 20, 22.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A compensator assembly for spanning between first and second frame components, comprising:
   a base member having a clip for engaging the first frame component;
   an extension member coupled with the base member; and
   a sleeve retained in the extension member and having an aperture extending through the base and inward protrusions for receiving a fastener and outward protrusions for engaging the extension member, wherein upon rotation of the sleeve, the extension member threadably rotates against the base member and away from the clip into contact with the second frame component.

2. The compensator assembly of claim 1, wherein the base member and the extension member are movable from an installation length spaced from the second frame component to a deployed length abutting the second frame component, such that further rotation of the fastener in the deployed length causes the fastener to engage between the first and second frame components.

3. The compensator assembly of claim 1, wherein the first frame component comprises a bracket extending from a roof rail and the second frame component comprises a moonroof structure.

4. The compensator assembly of claim 1, wherein a first coefficient of friction between the sleeve and the fastener is greater than a second coefficient of friction between the base member and the extension member, such that the fastener overcomes the first coefficient of friction when the extension member contacts the second frame component.

5. The compensator assembly of claim 1, wherein the fastener extends coaxially through the base and extension members to engage the first and second frame components.

6. The compensator assembly of claim 1, wherein the clip is configured to engage an edge of the first frame component.

7. The compensator assembly of claim 6, wherein the clip has a retention member biased toward a bottom surface of a platform member, whereby the clip engages the edge between the retention member and the bottom surface of the platform member.

* * * * *